(12) United States Patent
Iwano et al.

(10) Patent No.: US 8,662,271 B2
(45) Date of Patent: Mar. 4, 2014

(54) DIFFERENTIALLY CONTROLLABLE TWO-WAY CLUTCH

(75) Inventors: Akira Iwano, Fukuroi (JP); Kazuhiko Muramatsu, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 386 days.

(21) Appl. No.: 12/954,667

(22) Filed: Nov. 25, 2010

(65) Prior Publication Data

US 2011/0127134 A1 Jun. 2, 2011

(30) Foreign Application Priority Data

Nov. 25, 2009 (JP) .................................. 2009-267393
Oct. 20, 2010 (JP) .................................. 2010-235529

(51) Int. Cl.
*F16D 41/08* (2006.01)

(52) U.S. Cl.
USPC ............................................. 192/44; 192/47

(58) Field of Classification Search
USPC ............... 192/47, 44, 45.006, 45.01, 45.014, 192/45.017, 45.018
See application file for complete search history.

(56) References Cited

U.S. PATENT DOCUMENTS

| | | | | |
|---|---|---|---|---|
| 1,421,994 A | * | 7/1922 | Rohrer | 192/43 |
| 2,104,320 A | * | 1/1938 | Fischer | 192/44 |
| 3,476,226 A | * | 11/1969 | Massey | 192/27 |
| 2002/0125095 A1 | * | 9/2002 | Ochab et al. | 192/35 |

FOREIGN PATENT DOCUMENTS

| | | |
|---|---|---|
| JP | 5-302632 A | 11/1993 |
| JP | 6-344796 A | 12/1994 |
| JP | 10-53044 A | 2/1998 |
| JP | 2002-5200 A | 1/2002 |

OTHER PUBLICATIONS

Office Action issued Aug. 2, 2012 in Chinese Patent Application No. 201010563268.8.

* cited by examiner

*Primary Examiner* — David D Le
*Assistant Examiner* — Ryan Dodd
(74) *Attorney, Agent, or Firm* — Miles & Stockbridge P.C.

(57) ABSTRACT

A differentially controllable two-way clutch including an outer wheel with a cam portion on an inner circumference, an inner wheel arranged apart from the outer wheel and toward an inner diameter of the two-way clutch as well as rotatably and concentrically with respect to the outer wheel, a torque transmission member located between the outer wheel and the inner wheel to transmit torque, a cage configured to hold the torque transmission member and to be slidable in a circumferential direction and which is differentially controlled, and a spring supported by the cage and configured to be capable of biasing the torque transmission member so that the torque transmission member engages with a cam surface.

5 Claims, 5 Drawing Sheets

DIFFERENTIALLY CONTROLLABLE TWO-WAY CLUTCH

BACKGROUND OF THE INVENTION

1. Field of the Invention

The present invention relates to a differentially controllable two-way clutch used for a power transmission mechanism and an auxiliary machine driving system in an automobile and configured to transmit and block power in two directions, a forward rotation direction and a backward rotation direction.

2. Description of the Related Art

In general, a two-way clutch is used for a power transmission mechanism and an auxiliary machine driving system in an automobile as means for switching a power transmission path. For example, when a hybrid car with two power sources, an internal combustion engine and an electric motor, travels using the electric motor in addition to the internal combustion engine, power from the electric motor is transmitted to an output shaft through a two-way clutch in both forward and backward rotation directions. Furthermore, as described in Japanese Patent Application Laid-Open Nos. 2002-5200, H6-344796, and H10-53044, the two-way clutch is also used for an auxiliary machine driving system that also uses an electric motor, a center differential in a four-wheel-drive car, and the like.

According to the two-way clutches in Japanese Patent Application Laid-Open Nos. 2002-5200, H6-344796, and H10-53044, a cylindrical surface is formed on one of an inner wheel and an outer wheel, whereas a cam surface is formed on the other of the inner and outer wheels. A torque transmission member such as a roller or a sprag is interposed between the cylindrical surface and the cam surface. The torque transmission member is held in the neutral position of the cam surface or in one of engaged positions of the cam surface. An electromagnetic clutch mechanism or a frictional driving mechanism is used to switch the phase of a cage configured to hold the torque transmission member.

However, in the configuration in which the torque transmission member is held in the neutral position of the cam surface, the torque transmission member is held by bias means provided in the cage. Thus, the torque transmission member cannot disadvantageously be reliably held at the neutral position. On the other hand, in the configuration in which the torque transmission member is held in one of the engaged positions of the cam surface, the cylindrical surface and the torque transmission member are in sliding contact with each other. Thus, while the two-way clutch is inactive (running idly), drag torque is generated, resulting in a disadvantageous increase in fuel consumption or the like.

SUMMARY OF THE INVENTION

Thus, an object of the present invention is to provide a differentially controllable two-way clutch configured to enable a cage to be differentially controlled and to allow rotation to be reliably locked in both a forward rotation direction and a backward rotation direction, the two-way clutch also preventing possible drag torque even in an idle running state.

To accomplish the object, the differentially controllable two-way clutch according to the present invention includes an outer wheel with a cam portion on an inner circumference, an inner wheel arranged apart from the outer wheel and toward an inner diameter of the two-way clutch as well as rotatably and concentrically with respect to the outer wheel, a torque transmission member located between the outer wheel and the inner wheel to transmit torque, a cage configured to hold the torque transmission member and to be slidable in a circumferential direction and which is differentially controlled, and a spring supported by the cage and configured to be capable of biasing the torque transmission member so that the torque transmission member engages with a cam surface.

The present invention exerts the following effects. The cage can be differentially controlled, and the rotation can be reliably locked in both the forward and backward rotation directions. Furthermore, no drag torque is generated even in the idle running state.

The term "torque transmission member" as used herein refers to a member that engages with a cam surface of the outer wheel and an outer circumferential surface of the inner wheel to transmit torque. The torque transmission member may have any shape provided that the torque transmission member can engage with the cam surface of the outer wheel. The torque transmission member may take any of various forms, for example, a roller, a ball, and a ball-like sprag.

Further features of the present invention will become apparent from the following description of exemplary embodiments with reference to the attached drawings.

DESCRIPTION OF THE EMBODIMENTS

Figure 1:
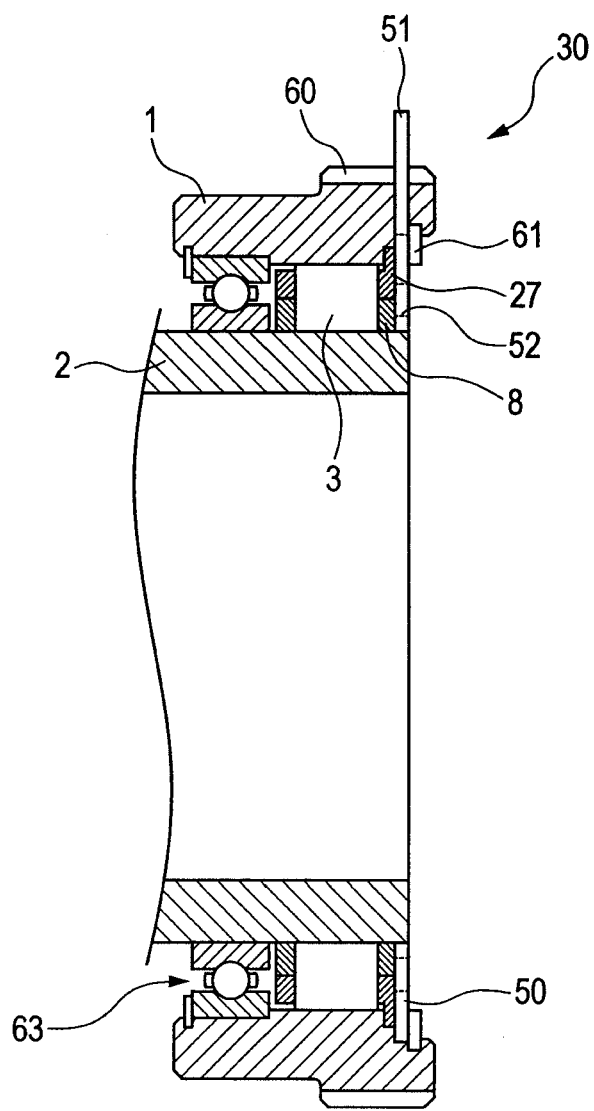
FIG. 1 is an axial sectional view of a differentially controllable two-way clutch according to an embodiment of the present invention.

Preferred embodiments of the present invention will now be described in detail in accordance with the accompanying drawings.

The present invention will be described below in detail with reference to the drawings. Of course, embodiments described below do not limit but illustrate the present invention. Furthermore, in the drawings, the same components are denoted by the same reference numerals.

FIG. 1 is an axial sectional view of a differentially controllable two-way clutch according to an embodiment of the present invention.

As shown in FIG. 1, a two-way clutch 30 includes an output shaft supported by a housing (not shown in the drawings) through a bearing (not shown in the drawings), that is, an inner wheel 2 that is rotatable in two directions, that is, rotatable clockwise and counterclockwise, and an outer wheel 1 non-rotatably coupled to the housing (not shown in the drawings) by a spline 60. The inner wheel 2 is rotatably supported by the outer wheel through a bearing 63.

A plurality of cam portions 12 (described below) are formed on the inner circumference of the outer wheel 1. A roller 3 is interposed between the outer circumferential surface of the inner wheel 2 and each of the cam portions 12. The roller 3 is held by a pair of cages 6 and 7 (described below) arranged between the outer wheel 1 and the inner wheel 2. The roller 3 is biased by an accordion spring 5 described below in a direction in which the roller 3 engages with the cam surface of the cam portion 12.

The two-way clutch 30 includes an annular switching plate 50 (described below in detail) provided at one axial end surface thereof and fitted on the outer wheel 1 so as to be pivotally movable within a predetermined range. Switching a lever 51 of the switching plate 50 controls the rotation direction of the two-way clutch. The switching plate 50 is prevented from slipping out in the axial direction, by means of a retainer 61 fixed to the outer wheel 1.

If only the inner wheel 2 coupled to a driving shaft (not shown in the drawings) is rotating, then in the present embodiment, since the roller 3 is neutral with respect to cam surfaces 40 and 41 as described below, the two-way clutch 30 is prevented from hindering rotation of the inner wheel 2. Thus, possible power loss and the like caused by drag torque is inhibited.

Figure 2:
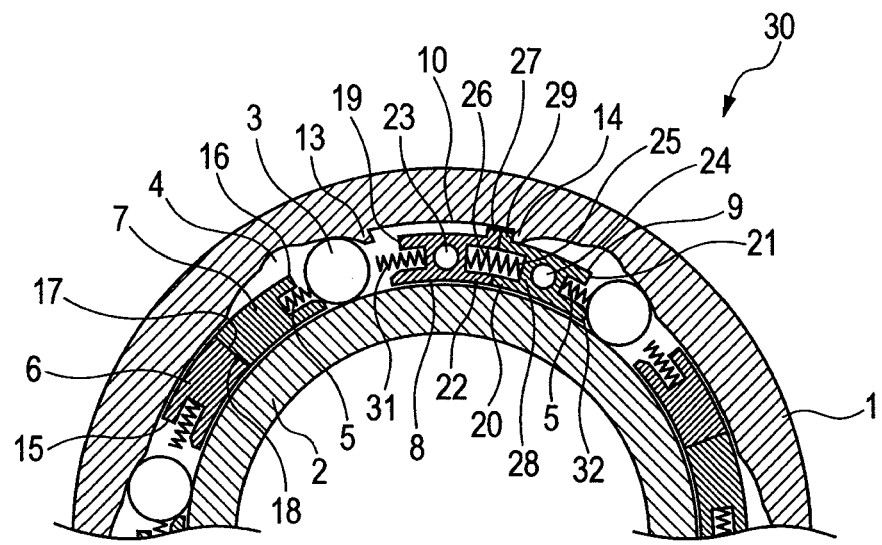
FIG. 2 is a partial sectional view of a differentially controllable two-way clutch showing an embodiment of the present invention and in which torque is being transmitted in a forward rotation direction.
Figure 3:
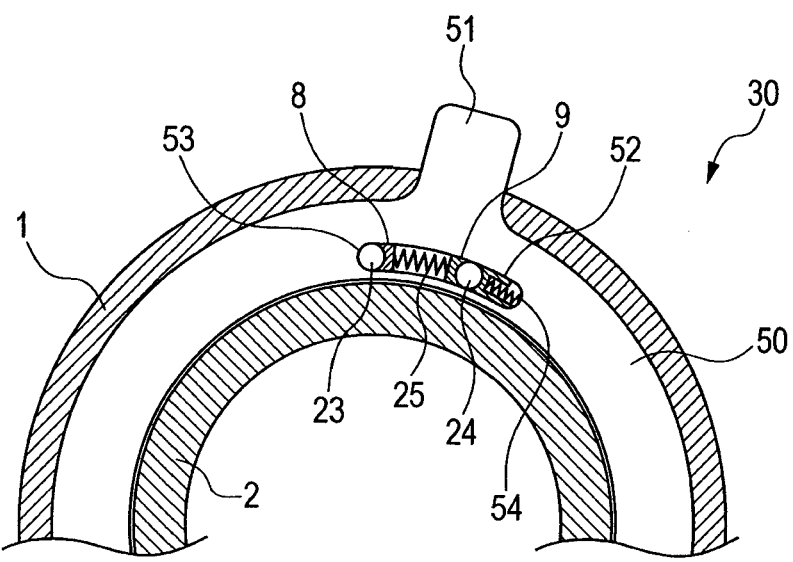
FIG. 3 is a front view of the differentially controllable two-way clutch showing the position of a switching plate in the state shown in FIG. 2.
Figure 4:
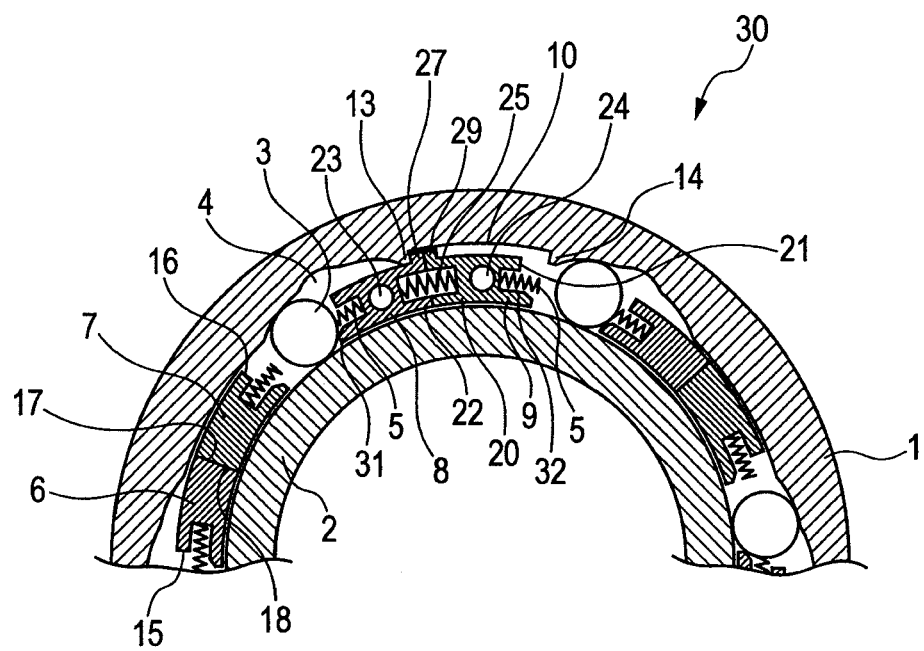
FIG. 4 is a partial sectional view of a differentially controllable two-way clutch showing an embodiment of the present invention and in which torque is being transmitted in a backward rotation direction.
Figure 5:
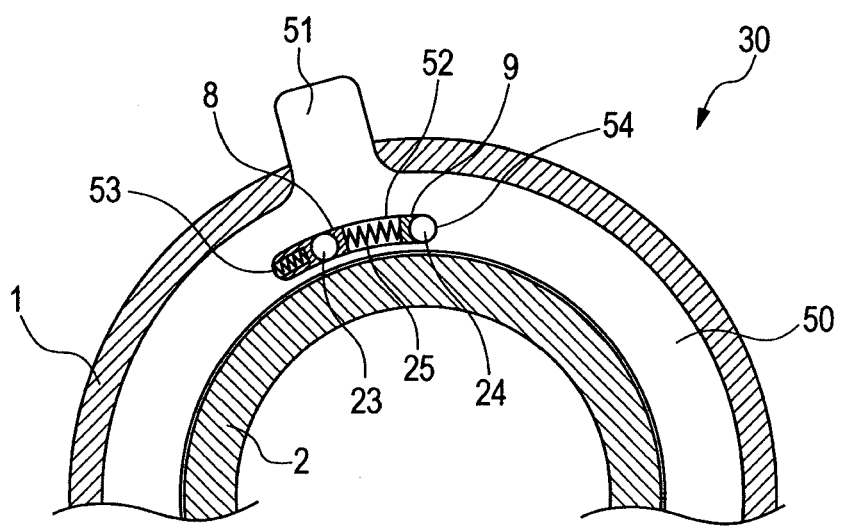
FIG. 5 is a front view of the differentially controllable two-way clutch showing the position of the switching plate in the state shown in FIG. 4.

That is, when the rollers 3 are neutral, the inner wheel 2 can rotate freely in the opposite directions. As shown in FIG. 2 and FIG. 3, when the roller 3 is in a rightward engaged state, the inner wheel 2 is inhibited from rotating forward (clockwise) and can rotate only backward. Furthermore, as shown in FIG. 4 and FIG. 5, when the roller 3 is in a leftward engaged state, the inner wheel 2 is inhibited from rotating backward (counterclockwise) and can rotate only forward. The two-way clutch 30 according to the present invention is used for a site to which power acting in two directions, that is, in the forward and backward rotation directions, can be transmitted. The lever 51 is switched to enable only the power acting in one of the directions to be transmitted. In the neutral state, both the power acting in the forward rotation direction and the power acting in the backward rotation direction can be blocked.

The switching plate 50 integrated with the lever 51 limits sliding (movement) of the cages 6 to 9. Thus, if the lever 51 is displaced in the forward rotation direction (clockwise), then as described below, the cages 6 to 9 slides relative to the outer wheel 1 until a protruding portion of each of the cages comes into abutting contact with an end surface of a movement limiting recess portion 10, while contracting a coil spring 25. At this time, the rollers 3 come into engagement with the cam surface 40. As a result, the clockwise rotation of the inner wheel 2 is limited. The inner wheel 2 can rotate only counterclockwise.

On the other hand, if the lever 51 is displaced in the backward rotation direction (counterclockwise), the rollers 3 come into engagement with the cam surface 41 to limit the counterclockwise rotation of the inner wheel 2. The inner wheel 2 can rotate only clockwise.

FIG. 2 and FIG. 3 show that the two-way clutch 30 according to an embodiment of the present invention is in a forward (clockwise) engaged state and that the inner wheel 2 is rotating only counterclockwise. The configuration of the differentially controllable two-way clutch 30 will be described with reference to FIG. 2. The "differentially controllable two-way clutch" is hereinafter referred to as the "two-way clutch" for simplification of description. Furthermore, of course, the description below does not limit but illustrates the present invention.

The two-way clutch 30 includes the outer wheel 1 with a cylindrical inner circumferential surface, and the inner wheel 2 arranged apart from the outer wheel 1 and toward the inner diameter of the two-way clutch 30 as well as relatively rotatably and concentrically with respect to the outer wheel 1 and having a cylindrical outer circumferential surface. The two-way clutch 30 further includes a plurality of torque transmission members arranged between the outer wheel 1 and the inner wheel 2 to transmit torque, that is, the rollers 3 in a cylindrical shape each with a circular axial cross section and the cages 6, 7, 8, and 9 configured to hold the respective rollers 3. The rollers 3 are rollable in the circumferential direction. The cages 6 to 9 are arranged so as to be slidable in the circumferential direction.

Pockets 4 are formed on the inner circumferential surface of the outer wheel 1 as recess portions depressed outward in the radial direction. Six pockets 4 are formed at equal intervals in the circumferential direction. The cam portion 12 engaged with the roller 3 is formed on an outer circumferential wall of each of the pockets 4.

Figure 8:
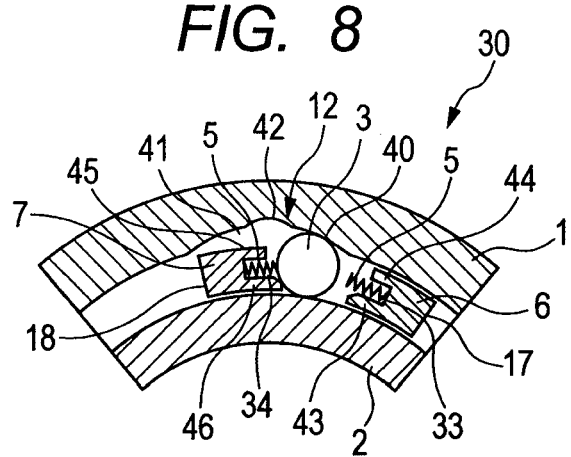
FIG. 8 is a schematic sectional view illustrating the operation of the differentially controllable two-way clutch according to the present invention and showing that torque is being transmitted in the forward rotation direction.
Figure 9:
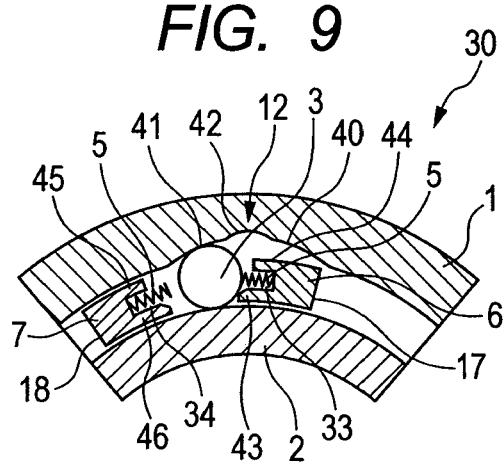
FIG. 9 is a schematic sectional view illustrating the operation of the differentially controllable two-way clutch according to the present invention and showing that torque is being transmitted in the backward rotation direction.
Figure 10:
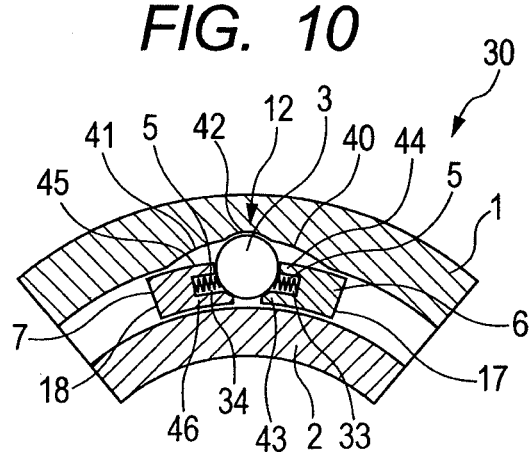
FIG. 10 is a schematic sectional view illustrating the operation of the differentially controllable two-way clutch according to the present invention and showing an idle running state in which the clutch is in a neutral position and is transmitting no torque.

Each of the cages 6 to 9 arranged in the annular space defined between the outer wheel 1 and the inner wheel has a sectional shape complementary to that of the annular space. Each of the cages 6 to 9 includes a top surface with a curvature complementary to that of the inner circumferential surface of the outer wheel 1 and a bottom surface with a curvature complementary to that of the outer circumferential surface of the inner wheel 2. The pair of cages 6 and 7 have almost the same shape and include a recess portion (described below) which holds a spring described below on the respective circumferential end surfaces 15 and 16. The cages 6 and 7 include nothing on the other end surfaces 17 and 18. The cages 6 and 7 thus lie opposite each other so as to be capable of coming into abutting contact with each other at the other end surfaces 17 and 18. As shown in FIGS. 8 to 10, the cages 6 and 7 are arranged such that the roller 3 is sandwiched between the end surfaces 15 and 16.

Some of the plurality of circumferentially provided cages the number of which corresponds to the number of the rollers 3 are configured differently from the cages 6 and 7. Each of the cages 8 and 9 provided at one location in the circumferential direction includes a recess portion on the opposite circumferential end surfaces. One circumferential end surface 19 of the cage 8 has the same configuration as that of the end surfaces 15 and 16 of the cages 6 and 7, and includes a recess portion 31 in which a spring is insertedly mounted. Furthermore, one circumferential end surface 20 of the cage 8 includes a recess portion 26 in which the coil spring 25 is insertedly mounted.

One circumferential end portion 21 of the cage 9 has the same configuration as that of the end surfaces 15 and 16 of the cages 6 and 7, and includes a recess portion 32 in which a spring is insertedly mounted. Furthermore, one circumferential end surface 22 of the cage 9 includes a recess portion 28 in which the coil spring 25 is insertedly mounted. The recess portions 26 and 28 have almost the same shape and are placed opposite each other when the end surfaces 20 and 22 of the cages 8 and 9 come into contact with each other. The recess portions 26 and 28 define one circumferential space in which the coil spring 25 is located.

The cage 8 includes a protruding portion 27 which is flush with the end surface 20 and which extends from the end surface 20 toward the outer diameter of the two-way clutch. The cage 9 includes a protruding portion 29 which is flush with the end surface 22 and which extends from the end surface 22 toward the outer diameter of the two-way clutch. The protruding portions 27 and 29 are fitted in the movement limiting recess portion 10, depressed toward the outer diameter of the two-way clutch, and are movable within the circumferential length of the recess portion 10. The movement limiting recess portion 10, which limits circumferential movement of the protruding portions 27 and 29, is formed at one circumferential location between the pockets 4.

The movement limiting recess portion 10 includes opposite circumferential end portions 13 and 14. An operation described below brings the protruding portion 27 into abutting contact with the end portion 13, while bringing the protruding portion 29 into abutting contact with the end portion 14, thus limiting the movement.

The accordion spring 5 is insertedly mounted in each of recess portions 33 and 34 (FIG. 8 to FIG. 10) of the respective cages 6 and 7 to apply a bias force to the roller 3. Furthermore, the cam portion 12, with which the roller 3 engages, includes the cam surface 40 with which the roller 3 engages when the outer wheel 1 and the inner wheel 2 rotate counterclockwise, the cam surface 41 with which the roller 3 engages when the outer wheel 1 and the inner wheel 2 rotate clockwise, and a recess defining an idle running surface formed halfway between the cam surfaces 40 and 41 and on which the roller 3 is held during idle running.

The cam surface 40, the cam surface 41, and the recess 42 are continuously formed in the pocket 4 in the outer wheel as shown in FIGS. 8 to 10 so as to each have predetermined curvatures. The cam surfaces 40 and 41 are formed as curved surfaces inclined from the outer diameter side toward inner diameter side of the two-way clutch. However, the cam surfaces 40 and 41 may be formed as linear slopes as long as the cam surfaces 40 and 41 provide a cam function.

The end surfaces 15, 16, 19, and 21 respectively of the cages 6 to 9 including the recess portions in which the accordion springs 5 are insertedly mounted have similar shapes. An outer diameter-side flange and an inner diameter-side flange forming the recess portion have different circumferential lengths. For example, as shown in FIGS. 8 to 10, an outer diameter-side flange 44 of the cage 6 is shorter than an inner diameter-side flange 43 thereof in the circumferential direction. Furthermore, an outer diameter-side flange 45 of the cage 7 is shorter than an inner diameter-side flange 46 thereof in the circumferential direction. This configuration is common to the end surfaces of all the cages in which the accordion springs 5 are insertedly mounted.

The cages 8 and 9, shaped differently from the other cages, include cylindrical projections 23 and 24 each provided at one axial end surface of the cage so as to project in the axial direction. The projections 23 and 24 are fitted in an elongated circumferential slot 52 in the switching plate 50 shown in FIG. 3 and other figures. The annular switching plate 50 includes the lever 51 configured to switch the rotation direction of the two-way clutch 30. The switching plate 50 is pivotally movably attached to one axial end of the two-way clutch 30.

The two-way clutch 30 includes the cages 6 and 7 at four locations in the circumferential direction and the pair of cages 8 and 9 at two locations in the circumferential direction. The pair of cages 8 and 9 are arranged at locations in the circumferential direction where the cages are out of phases with each other by almost 180 degrees. Two sets of cages 6 and 7 are arranged between the pair of cages 8 and 9. Six rollers 3 are arranged in the circumferential direction. Of course, these numbers can be changed as required.

A plurality of cages are annularly provided and include the pair of cages 8 and 9, which engage with the switching plate 50, and the cages 6 and 7, which do not engage with the switching plate 50.

The operation of the two-way clutch 30 according to an embodiment of the present invention will be described below with reference to FIG. 2 to FIG. 10. It is hereinafter assumed that the outer wheel 1 is fixed so that the rotation of the inner wheel 2 is transmitted to the outer wheel. FIGS. 3, 5, and 7 are front views of the two-way clutch shown in FIG. 1 as seen from the right of FIG. 1. The retainer 61 is omitted in FIGS. 3, 5, and 7.

[Clockwise (Forward Rotation-Wise) Engaged State]

FIG. 2 and FIG. 3 show that the two-way clutch 30 is in a clockwise (forward rotation-wise) engaged state. The switching plate 50 is omitted in FIG. 2.

As shown in FIG. 3, when the lever 51 is switched to the forward rotation direction, the projection 23 of the cage 8 fitted in the slot 52 in the switching plate 50 abuts against an end portion 53 of the slot 52. This prevents the switching plate 50 from further moving pivotally clockwise. This is because pivotal movement of the switching plate 50 moves the cage 8 clockwise to allow the end surface 20 of the cage 8 to come into abutting contact with the end surface 22 of the cage 9, as is apparent from FIG. 2. The abutting contact between the end surfaces 20 and 22 allows the protruding portion 27 of the cage 8 and the protruding portion 29 of the cage 9 to also come into abutting contact with each other. Thus, the cage 9 pushed by the movement of the cage 8 and displaced in the circumferential direction moves apparently integrally with the cage 8. When the protruding portion 29 comes into abutting contact with the circumferential end portion 14 of the movement limiting recess portion 10, the cage 9 is prevented from moving further.

In the above-described state, as shown in FIG. 2, the end portion 21 of the cage 9 moves the roller 3 toward the cam surface 40 and the roller 3 is biased clockwise by the accordion spring 5 insertedly mounted in the recess portion of the end portion 21. Thus, the roller 3 comes into engagement with the cam surface 40 and the inner circumferential surface of the inner wheel 2. At this time, the cage 7 located opposite the cage 8 across the roller 3 apparently moves integrally with the cage 6 in conjunction with the rotation of the inner wheel. The cage 7 thus moves toward the roller 3. Hence, the accordion spring 5 in the cage 7 biases the roller 3 in a direction in which the roller 3 comes into engagement with the cam surface 40 (see FIGS. 8 to 10). That is, the roller 3 that is not biased by the cage 9 is biased by the cage 7. As a result, the clockwise rotation of the inner wheel 2 is limited, and the inner wheel 2 can rotate only counterclockwise. Consequently, torque can be transmitted counterclockwise.

<Counterclockwise (Backward Rotation-Wise) Engaged State>

FIG. 4 and FIG. 5 show that the two-way clutch 30 is in a counterclockwise (backward rotation-wise) engaged state. The switching plate 50 is omitted in FIG. 4.

The counterclockwise engagement of the roller 3 is an operation exactly opposite to the clockwise rotation. As shown in FIG. 5, when the lever 51 is switched to the backward rotation direction, the projection 24 of the cage 9 fitted in the slot 52 in the switching plate 50 abuts against an end portion 54 of the slot 52. This prevents the switching plate 50 from further moving pivotally counterclockwise. This is because pivotal movement of the switching plate 50 moves the cage 9 counterclockwise to allow the end surface 22 of the cage 9 to come into abutting contact with the end surface 20 of the cage 8, as is apparent from FIG. 4. The abutting contact between the end surfaces 20 and 22 allows the protruding portion 27 of the cage 8 and the protruding portion 29 of the cage 9 to come into abutting contact with each other. Thus, the cage 8 pushed by the movement of the cage 9 and displaced in the circumferential direction moves apparently integrally with the cage 9. When the protruding portion 27 comes into abutting contact with the circumferential end portion 13 of the movement limiting recess portion 10, the cage 8 is prevented from moving further.

In the above-described state, as shown in FIG. 4, the end portion 19 of the cage 8 moves the roller 3 toward the cam surface 41 and the roller 3 is biased counter clockwise by the accordion spring 5 insertedly mounted in the recess portion of the end portion 19. Thus, the roller 3 comes into engagement with the cam surface 41 and the inner circumferential surface of the inner wheel 2. At this time, the cage 6 located opposite the cage 9 across the roller 3 apparently moves integrally with the cage 7 in conjunction with the rotation of the inner wheel. The cage 6 thus moves toward the roller 3. Hence, the accordion spring 5 in the cage 6 biases the roller 3 in a direction in which the roller 3 comes into engagement with the cam surface 41 (see FIGS. 8 to 10). That is, the roller 3 that is not biased by the cage 8 is biased by the cage 6. As a result, the counterclockwise rotation of the inner wheel 2 is limited, and the inner wheel 2 can rotate only clockwise. Consequently, torque can be transmitted clockwise.

Of course, even while a rotation torque is being transmitted clockwise and while a rotation torque is being transmitted counterclockwise as shown in FIG. 2 to FIG. 5, the other rollers 3 all synchronously engage with the predetermined cam surface. The pair of cages, between which the roller 3 is sandwiched, are differentially controlled. The spring in one of the cages biases the roller 3. The other cage is located away from the roller 3 and the spring therein applies no bias force to the roller 3. This will be described below with reference to FIG. 8 to FIG. 10.

<Neutral Position (Idle Running State of the Inner Wheel)>

Figure 6:
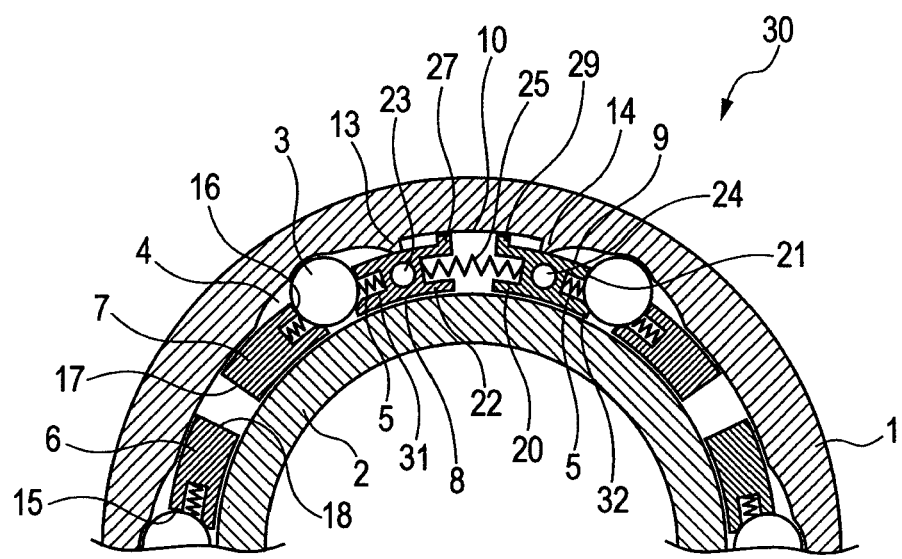
FIG. 6 is a partial sectional view of a differentially controllable two-way clutch showing an embodiment of the present invention as well as an idle running state in which no torque is being transmitted between an inner wheel and an outer wheel.
Figure 7:
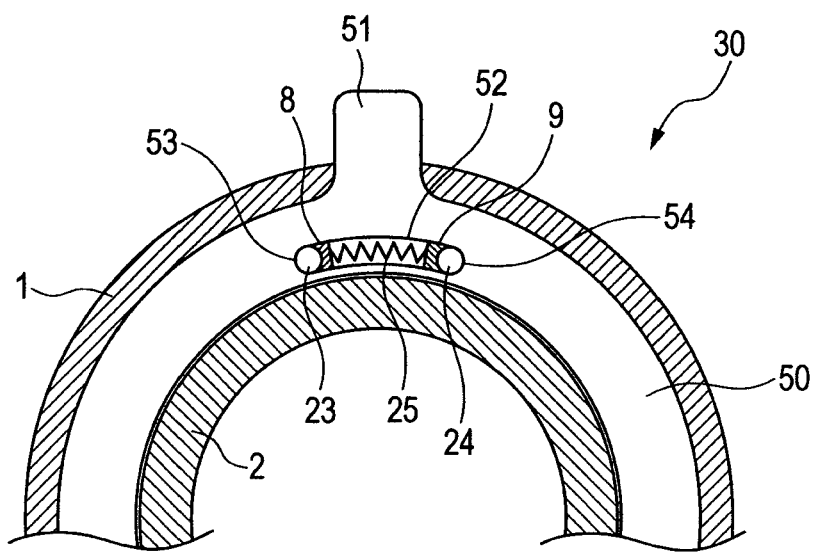
FIG. 7 is a front view of the differentially controllable two-way clutch showing the position of the switching plate in the state shown in FIG. 6.

FIG. 6 and FIG. 7 show that the two-way clutch 30 is not in the clockwise or counterclockwise engaged state. That is, in this state, the inner wheel 2 does not engage with the roller 3, and can thus rotate both clockwise and counterclockwise. The switching plate 50 is not shown in FIG. 6.

When the lever 51 is switched to the neutral position, the switching plate 50 is kept in the neutral position shown in FIG. 7. At this time, the cages 8 and 9 are located at respective circumferential positions where the protruding portions 27 and 29 of the respective cages 8 and 9 lie between the end portions 13 and 14 of the movement limiting recess portion 10. Neither of the protruding portions 27 and 29 is in abutting contact with the end portions 13 and 14. In this state, neither the cage 8 with the protruding portion 27 nor the cage 9 with the protruding portion 29 is subjected to the forces acting in the forward and backward rotation directions from the lever 51. The cages 8 and 9 are separated from each other in the opposite circumferential directions by the bias force of the coil spring 25. Thus, as shown in FIG. 7, the projection 23 of the cage 8 is in abutting contact with the end portion 53 of the slot 52. The projection 24 of the cage 9 is in abutting contact with the end portion 54 of the slot 52.

In the neutral position, the roller 3 is sandwiched between the two circumferentially opposite cages and between the accordion springs 5. As shown in FIG. 6, the roller 3 is positioned at a central portion of the cam portion 12 which is most greatly depressed toward the outer diameter of the two-way clutch. The roller 3 is further separated from the outer circumferential surface of the inner wheel 2 and fails to engage with the cam surfaces 40 and 41 of the outer wheel 1. Thus, the inner wheel 2 can rotate both clockwise and counterclockwise. That is, the inner wheel 2 is running idly. In the neutral state, no drag torque is generated. Hence, a possible resultant increase in fuel consumption can be prevented.

Now, with reference to FIG. 8 to FIG. 10, the operation of the two-way clutch 30 according to the present invention will be described in further detail. FIG. 8 is a schematic sectional view illustrating the operation of the two-way clutch and corresponds to FIG. 2 and FIG. 3. FIG. 8 shows that the two-way clutch is in the clockwise (forward rotation-wise) engaged state. Furthermore, FIG. 9 is a schematic sectional view illustrating the operation of the two-way clutch and corresponds to FIG. 4 and FIG. 5. FIG. 9 shows that the two-way clutch is in the counterclockwise (backward rotation-wise) engaged state. Moreover, FIG. 10 is a schematic sectional view illustrating the operation of the two-way clutch and corresponds to FIG. 6 and FIG. 7. FIG. 10 shows that the roller 3 is in the neutral state in which the roller 3 does not engage either with cam surface 40 or with the cam surface 41 and in which the inner wheel 2 can rotate both clockwise and counterclockwise. That is, the roller 3 is in the idle running state.

In FIG. 8, the two-way clutch 30 is in the clockwise engaged state. The clockwise rotation of the inner wheel 2 is limited, and the inner wheel 2 can rotate only counterclockwise. Thus, torque can be transmitted counterclockwise. At this time, the cage 7, which is one of the pair of cages 6 and 7 arranged opposite each other across the roller 3 and which is positioned opposite the rotation direction, moves in the rotation direction (rightward in FIG. 8) so that the accordion spring 5 biases the roller 3. This ensures that the roller 3 engages with the cam surface 40 and the outer circumferential surface of the inner wheel 2. On the other hand, the cage 6 located on the rotation direction side moves away from the roller 3. The accordion spring 5 in the cage 6 moves away from and avoids biasing the roller 3.

Then, if the two-way clutch 30 transmits torque in the backward rotation direction, the operation is exactly opposite to that shown in FIG. 8. As shown in FIG. 9, the two-way clutch 30 is in the counterclockwise engaged state. The counterclockwise rotation of the inner wheel 2 is limited, and the inner wheel 2 can rotate only clockwise. Thus, torque can be transmitted clockwise. At this time, the cage 6, which is one of the pair of cages 6 and 7 arranged opposite each other across the roller 3 and which is positioned opposite the rotation direction, moves in the rotation direction (leftward in FIG. 9) so that the accordion spring 5 biases the roller 3. This ensures that the roller 3 engages with the cam surface 41 and the outer circumferential surface of the inner wheel 2. On the other hand, the cage 7 located on the rotation direction side moves away from the roller 3. The accordion spring 5 in the cage 7 moves away from and avoids biasing the roller 3.

As described above, the pair of cages are differentially driven. One of the cages allows the accordion spring 5 to exert the bias force required for the engagement. The other cage avoids contacting the roller 3 and allowing the accordion spring 5 to apply a bias force.

FIG. 10 shows that the two-way clutch 30 is in the neutral state in which the roller 3 does not engage either with the cam surface 40 or with the cam surface 41 and in which the inner wheel 2 can rotate both clockwise and counterclockwise. That is, the roller 3 is in the idle running state. In this state, the roller 3 is sandwiched between the pair of cages 6 and 7 and positioned in a recess 42 located at the circumferential center of the cam portion 12, so as to float from the outer circumferential surface of the inner wheel 2, that is, to be separated therefrom, by the bias forces of the accordion springs in the respective cages 6 and 7. The roller 3 is held so as to be carried by the pair of accordion springs 5 and is separated both from the outer circumferential surface of the inner wheel 2 and from the recess 42 in the outer wheel 1 through predetermined clearances. Thus, no drag torque is generated during idle running.

To allow the roller 3 to be reliably held and disconnected from the outer circumferential surface of the inner wheel 2 in the neutral position, the cages 6 to 9 are shaped as shown in the figures. The end portions of all the cages located opposite the respective rollers 3 are shaped similarly to those in the configuration described below. Here, the cages 6 and 7 will be described with reference to FIG. 10 by way of example. In the neutral position, the cages 6 and 7 are separate from each other with the end surfaces 17 and 18 thereof avoiding abutting contact with each other The cages 6 and 7 are open toward the roller 3 and include the recess portions 33 and 34, respectively. As described above, the accordion spring 5 is interposed in each of the recess portions 33 and 34. The cage 6 includes the inner diameter flange 43 extending in the circumferential direction and the outer diameter flange 44 extending in the circumferential direction and having a smaller circumferential length than the inner diameter flange 43. The cage 7 includes the inner diameter flange 45 extending in the circumferential direction and the outer diameter flange 46 extending in the circumferential direction and having a smaller circumferential length than the inner diameter flange 45. The recess portion 33 is defined between the inner diameter flange 43 and the outer diameter flange 44. The recess portion 34 is defined between the inner diameter flange 45 and the outer diameter flange 46.

As shown in FIG. 10, when the roller 3 is in the neutral position, the pair of inner diameter flanges 43 and 45 are located partly below the roller 3 to the inside of the roller 3. Thus, even if the bias forces of the accordion springs 5 are weakened during idle running, the inner diameter flanges 43 and 45 allow the roller 3 to be separated from the outer circumferential surface of the inner wheel 2. Hence, possible drag torque can be prevented.

The edges of the inner and outer diameter flanges which are capable of contacting the roller 3 are chamfered so as to have a curvature similar to that of the roller 3 so that the shape of the edges is complementary to that of the roller 3. A force equal to or stronger than the bias force of the accordion spring 5 is required to allow the roller 3 located in the neutral position to slip out of the recess 42 in the outer wheel 1. When the force is smaller than the bias force of the accordion spring 5, the roller 3 itself acts autonomously to return to the neutral position.

As described above, as shown in FIG. 3, displacing the lever 51 rightward in FIG. 3 allows the clockwise rotation of the inner wheel 2 to be limited so that the inner wheel 2 can rotate in only one direction, that is, counterclockwise. Furthermore, as shown in FIG. 5, displacing the lever 51 leftward in FIG. 5 allows the counterclockwise rotation of the inner wheel 2 to be limited so that the inner wheel 2 can rotate in only one direction, that is, clockwise. In this manner, the two-way clutch 30 can be locked in the two directions, allowing the rotation direction of the inner wheel 2 to be correspondingly limited. Displacing the lever 51 to the neutral position shown in FIG. 7 allows the two-way clutch 30 to be unlocked. Thus, the inner wheel 2 can be rotated both clockwise and counterclockwise. That is, the rotation direction of the inner wheel 2 can be easily changed simply by operating the lever 51.

The present invention uses the pair of cages to control the movement in the two directions. Specifically, the lever 51 projecting from the switching plate 50 is used to control the movement in the two directions. Operating and placing the lever 51 in the one desired direction allows the protruding portion of one of the cages to move to the end portion of the movement limiting recess portion. When the protruding portion comes into abutting contact with the end portion, the movement of the other cage is limited by the slot 52 in the switching plate 50. The other cage moves in the direction in which the accordion spring fitted in the cage contracts.

In the neutral position, the roller 3 is held by the accordion springs in both cages. When the lever 51 is pivotally moved to move the cages, the accordion spring 5 in one of the cages stops biasing the roller. Thus, the accordion spring 5 in the other cage moves and brings the roller 3 into the engaged state.

The present invention can be used for general power transmission mechanisms. However, the present invention is applicable to a power transmission mechanism for a hybrid car including a combination of engine driving and electric motor driving. The present invention is also applicable to a system configured to start an air conditioner simply by actuating an electric motor without driving an engine.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-267393, filed Nov. 25, 2009, and Japanese Patent Application No. 2010-235529, filed Oct. 20, 2010, which are hereby incorporated by reference herein in their entirety.

What is claimed is:

1. A differentially controllable two-way clutch comprising an outer wheel with a cam portion on an inner circumference, an inner wheel arranged apart from the outer wheel and toward an inner diameter of the two-way clutch as well as rotatably and concentrically with respect to the outer wheel, torque transmission members located between the outer wheel and the inner wheel to transmit torque, a pair of cages each of which is engageable with a respective adjacent torque transmission member and slidable in a circumferential direction and which are differentially controlled, a respective spring supported by each cage and configured to be capable of biasing the adjacent torque transmission member so that the torque transmission member engages with a cam surface, and an annular switching plate provided at one axial end surface of the clutch and pivotally movably fitted on the outer wheel, wherein the switching plate moves relative to the pair of cages to selectively engage each cage and thereby differentially control the cages, and the respective spring supported by each cage biases the adjacent torque transmission member in accordance with a movement of that cage.

2. The differentially controllable two-way clutch according to claim 1, wherein the cam portion comprises a cam surface for forward rotation, a cam surface for backward rotation, and a recess formed between the cam surface for forward rotation and the cam surface for backward rotation.

3. The differentially controllable two-way clutch according to claim 1, wherein the switching plate comprises a slot penetrating the switching plate in an axial direction and extending in a circumferential direction, and a lever projecting in a radial direction, wherein each of the pair of cages comprises a projection protruding in the axial direction and fitted in the slot and a protruding portion protruding outward in the radial direction, wherein a recess portion depressed toward an outer diameter is formed on the inner circumference of the outer wheel and the protruding portions of the pair of cages are fitted in the recess portion, and wherein when the lever is operated to pivotally move the switching plate, movement of the protruding portions in the recess portion and movement of the projections in the slot are each limited to a predetermined range to differentially control the pair of cages.

4. The differentially controllable two-way clutch according to claim 1, wherein each of the pair of cages comprises an inner diameter flange located opposite the adjacent torque transmission member and extending in the circumferential direction, and an outer diameter flange extending in the circumferential direction and having a smaller circumferential length than the inner diameter flange, wherein the respective spring is located in a recess portion which is defined between the inner diameter flange and the outer diameter flange and which is open toward the adjacent torque transmission member.

5. The differentially controllable two-way clutch according to claim 1, wherein the torque transmission member is a cylindrical roller.

* * * * *